(12) United States Patent
Kania et al.

(10) Patent No.: US 7,722,958 B2
(45) Date of Patent: May 25, 2010

(54) ORGANIC SOLVENT-FREE FILM-FORMING COMPOSITIONS, MULTI-LAYER COMPOSITE COATINGS, AND RELATED METHODS

(75) Inventors: Charles M. Kania, Natrona Heights, PA (US); Roxalana L. Martin, Pittsburgh, PA (US); Carolyn A. K. Novak, Gibsonia, PA (US); Thomas R. Hockswender, Gibsonia, PA (US); Mark A. Tucker, Gibsonia, PA (US); Mary Beth Grolemund, Sarver, PA (US); Deirdre Ragan, Gibsonia, PA (US); Alicia Williams, Greensboro, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/754,694

(22) Filed: May 29, 2007

(65) Prior Publication Data

US 2007/0218274 A1    Sep. 20, 2007

Related U.S. Application Data

(62) Division of application No. 10/841,659, filed on May 7, 2004, now Pat. No. 7,241,830.

(51) Int. Cl.
*B32B 5/16* (2006.01)
*B32B 9/04* (2006.01)

(52) U.S. Cl. .................. 428/447; 428/323; 428/328; 428/329; 428/331

(58) Field of Classification Search ................ None
See application file for complete search history.

(56) References Cited

U.S. PATENT DOCUMENTS

| | | | |
|---|---|---|---|
| 4,046,729 A | 9/1977 | Scriven et al. | 524/589 |
| 5,250,164 A | 10/1993 | Valko | 204/500 |
| 5,916,992 A | 6/1999 | Wilt et al. | 528/15 |
| 5,939,491 A | 8/1999 | Wilt et al. | 525/100 |
| 6,033,545 A | 3/2000 | Kaylo et al. | 204/489 |
| 6,329,060 B1 | 12/2001 | Barkac et al. | 428/423.1 |
| 6,387,519 B1 | 5/2002 | Anderson et al. | 428/447 |
| 6,387,997 B1 | 5/2002 | Grolemund et al. | 524/506 |
| 6,462,139 B1 | 10/2002 | Das et al. | 525/329.9 |
| 2005/0100685 A1* | 5/2005 | Flosbach et al. | 428/31 |

OTHER PUBLICATIONS

Paper entitled: "Aktueller Status bei der Pulverlackentwickluna fur die Automobilindustrie am Beispiel fuller und Klarlack" was presented by Dr. W. Kries of BASF Coatings AG Munster, Germany at the 1 st International Conference of Car-Body Powder Coatings, Berlin held in Berlin on Jun. 22-23, 1998, reprinted in Focus on Powder Coatings, The Royal Society of Chemistry, Sep. 2-8, 1998.
"Water-Swellable Hydrophobic Porous Copolymers Based on Divinylbenzene and Methy Acrylate: Preparation and Water-Swelling Behavior," by J. Wei, X. Y. Bai, and J. Yan, Dept. of Chemistry, East China Normal University, Published in Macromolecules 2003, 36, pp. 4690-4966.

* cited by examiner

*Primary Examiner*—Sheeba Ahmed
(74) *Attorney, Agent, or Firm*—Robert A. Diaz

(57) ABSTRACT

Provided is a film-forming composition substantially free of organic solvent which includes an aqueous dispersion of polymeric microparticles prepared by emulsion polymerization of a monomeric composition containing (1) at least 10 percent by weight of one or more vinyl aromatic compounds; (2) 0.1 to 10 percent by weight of one or more carboxylic acid functional polymerizable, ethylenically unsaturated monomers; (3) 0 to 10 percent by weight of one or more polymerizable monomers having one or more functional groups capable of reacting to form crosslinks; and (4) one or more polymerizable ethylenically unsaturated monomers. Each of (1), (2), (3) and (4) are different one from the other and at least one of (3) and (4) is present in the monomeric composition. Multi-layer composite coatings and coated substrates also are provided.

28 Claims, 1 Drawing Sheet

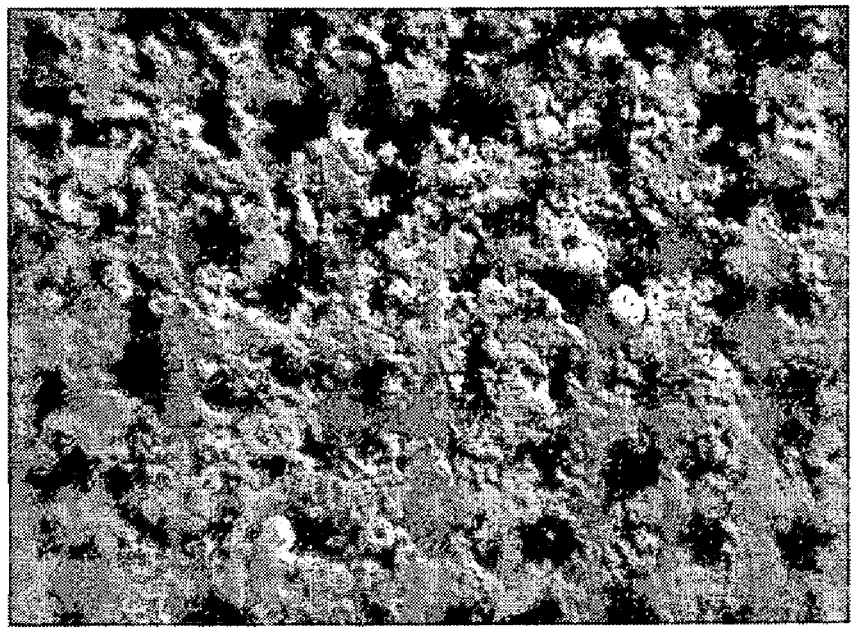
Image 1
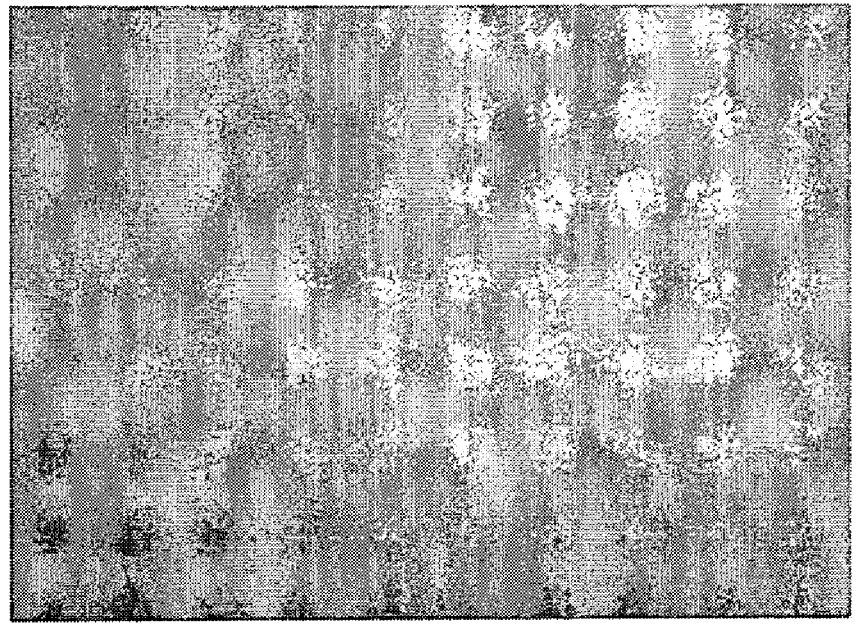
Image 2

ORGANIC SOLVENT-FREE FILM-FORMING COMPOSITIONS, MULTI-LAYER COMPOSITE COATINGS, AND RELATED METHODS

CROSS-REFERENCE TO RELATED APPLICATION

This application is a division of U.S. patent application Ser. No. 10/841,659, filed on May 7, 2004.

This application is related to U.S. patent application Ser. No. 10/841,662, entitled, "Film-Forming Composition Substantially Free of Organic Solvent, Multi-Layer Composite Coatings and Methods Related Thereto" filed May 7, 2004.

FIELD OF THE INVENTION

The present invention relates to substantially organic solvent free, film-forming compositions, as well as to multi-layer composite coatings formed from such compositions which are particularly useful as automotive coatings.

BACKGROUND INFORMATION

Color-plus-clear coating systems formed from the application of a transparent topcoat over a colored basecoat have become increasingly popular in the coating industry, particularly for use in coating automobiles. The most economically attractive color-plus-clear systems are those in which the clear coat composition can be applied directly over the uncured colored base coat. The process of applying one layer of a coating before the previous layer is cured, then simultaneously curing both layers, is referred to as a wet-on-wet ("WOW") application. Color-plus-clear coating systems suitable for WOW application provide a substantial energy cost savings advantage.

Over the past decade, there has been an effort to reduce atmospheric pollution caused by volatile solvents which are emitted during the painting process. However, it is often difficult to achieve high quality, smooth coating finishes, particularly clear coating finishes, such as are required in the automotive industry, without including organic solvents which contribute greatly to flow and leveling of a coating. Organic solvents also can be selected to control rheology of the coating as it is applied, particularly on vertical surfaces. By contrast, water-based coatings which contain little or no organic solvent can exhibit "sagging" or running upon application especially in a high humidity environment. Moreover, in addition to achieving near-flawless appearance, automotive coatings must be durable and chip resistant, yet economical and easy to apply.

Recently, to facilitate throughput in some automotive assembly plants, manufacturers have demanded that the primer-surfacer coating be applied in one coat, as opposed to the conventional two-coat application. The one-coat application can simplify the coating process and reduce capital investment by elimination of a spray booth and related equipment from the coating line. However, in a one-coat application, to achieve desired film-thicknesses, the primer coating composition must be applied using a high fluid delivery rate. When a water-based primer is applied at these high fluid delivery rates, particularly in a high humidity environment (e.g., 75% relative humidity at 75° F. (23.9° C.)), a very wet film usually is obtained and sagging or running of the applied wet coating can result.

The use of powder coatings to eliminate the emission of volatile solvents during the painting process has become increasingly attractive. Powder coatings have become quite popular for use in coatings for automotive components, for example, wheels, axle parts, seat frames and the like. Use of powder coatings for clear coats in color-plus-clear systems, however, is somewhat less prevalent for several reasons. First, powder coatings require a different application technology than conventional liquid coating compositions and, thus, require expensive modifications to existing application lines. Also, most automotive topcoating compositions typically are cured at temperatures below 140° C. By contrast, most powder coating formulations require a much higher curing temperature. Further, many powder coating compositions tend to yellow more readily than conventional liquid, coating compositions, and generally result in coatings having a high cured film thickness, often ranging from 60 to 70 microns.

Powder coatings in slurry form for automotive coatings can overcome many of the disadvantages of dry powder coatings, however, powder slurry compositions can be unstable and settle upon storage at temperatures above 20° C. Further, WOW application of powder slurry clear coating compositions over conventional base coats can result in mud-cracking of the system upon curing. See Aktueller Status bei der Pulverlackentwickluna fur die Automobilindustrie am Beispiel fuller und Klarlack, presented by Dr. W. Kries at the 1st International Conference of Car-Body Powder Coatings, Berlin, Germany, Jun. 22-23, 1998, reprinted in Focus on Powder Coatings, The Royal Society of Chemistry, Sep. 2-8, 1998.

Some aqueous dispersions are known to form powder coatings upon application at ambient temperatures. Although applied as conventional waterborne coating compositions, these dispersions form powder coatings at ambient temperature which require a ramped bake prior to undergoing conventional curing conditions in order to effect a coalesced and continuous film on the substrate surface. Also, many waterborne coating compositions contain a substantial amount of organic solvent to provide flow and coalescence of the applied coating.

The automotive industry would derive a significant economic benefit from an essentially organic solvent-free coating composition which meets the stringent automotive appearance and performance requirements, while maintaining ease of application and properties, such as sag and crater resistance. Also, it would be advantageous to provide an organic solvent-free clear coat composition which can be applied by conventional application means over an uncured pigmented base coating composition (i.e., via WOW application) to form a generally continuous film at ambient temperature which provides a cured film free of mud-cracking.

SUMMARY OF THE INVENTION

The present invention is directed to a film-forming composition that is substantially free of organic solvent. The film-forming composition comprises an aqueous dispersion of polymeric microparticles prepared by emulsion polymerization of a monomeric composition comprising: (1) at least 10 percent by weight of one or more vinyl aromatic compounds; (2) 0.1 to 10 percent by weight of one or more carboxylic acid functional polymerizable, ethylenically unsaturated monomers; (3) 0 to 10 percent by weight of one or more polymerizable monomers having one or more functional groups which are capable of reacting to form crosslinks; and (4) one or more polymerizable ethylenically unsaturated monomers, where the weight percentages are based on total weight of monomers present in the monomeric composition, wherein each of (1), (2), (3) and (4) are different one from the other, and wherein at least one of (3) and (4) is present in the monomeric composition.

The present invention also is directed to a multi-layer composite coating comprising a basecoat deposited from at least one basecoat film-forming composition, and a topcoat composition applied over at least a portion of the base coat in which the topcoat is deposited from at least one topcoat film forming composition, wherein at least one of the basecoat and topcoat is formed from the film-forming composition Substrates coated with the aforementioned compositions and composite coatings are also provided.

DETAILED DESCRIPTION OF THE INVENTION

For purposes of the following detailed description, it is to be understood that the invention may assume various alternative variations and step sequences, except where expressly specified to the contrary. It is also to be understood that the specific devices and processes are simply exemplary embodiments of the invention. Hence, specific dimensions and other physical characteristics related to the embodiments disclosed herein are not to be considered as limiting. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The film-forming composition of the present invention is substantially free of organic solvent. As used herein, including the claims, the term "substantially free of organic solvent" means that the amount of organic solvent present in the film-forming composition is less than 10 weight percent based on total weight of the film-forming composition. In an embodiment of the present invention, the amount of organic solvent present in the film-forming composition can be less than 5 weight percent, or less than 2 weight percent, where weight percentages are based on total weight of the film-forming composition. It should be understood, however, that a small amount of organic solvent can be present in the composition, for example, to improve flow and leveling of the applied composition or to decrease viscosity as needed.

The film-forming composition comprises an aqueous dispersion of polymeric microparticles prepared by emulsion polymerization techniques, as are well known in the art, from a monomeric composition comprising (1) at least 10 percent by weight of one or more vinyl aromatic compounds; (2) 0.1 to 10 percent by weight of one or more carboxylic acid functional polymerizable, ethylenically unsaturated monomers; (3) 0 to 10 percent by weight of one or more polymerizable monomers having one or more functional groups which are capable of reacting to form crosslinks; and (4) one or more polymerizable ethylenically unsaturated monomers, where the weight percentages are based on total weight of monomers present in the monomeric composition. Each of (1), (2), (3) and (4) above are different one from the other, and at least one of the monomers (3) and (4) is present in the monomeric composition.

As used herein, the phrase, "different one from the other" refers to components which do not have the same chemical structure as the other components in the composition.

The vinyl aromatic compound (1) can comprise any suitable vinyl aromatic compound known in the art. In an embodiment of the present invention, the one or more vinyl aromatic compounds (1) can comprise a compound selected from styrene, alpha-methyl styrene, vinyl toluene, para-hydroxy styrene, and mixtures thereof. In a particular embodiment of the present invention, the vinyl aromatic compound (1) comprises styrene.

The vinyl aromatic compound (1) can be present in the monomeric composition from which the polymeric microparticles are prepared in an amount of at least 10 percent by weight, or at least 20 percent by weight, or at least 30 percent by weight, or at least 40 percent by weight based on total weight of monomers present in the monomeric composition. The vinyl aromatic compound (1) also can be present in the monomeric composition from which the polymeric microparticles are prepared in an amount of not more than 98 percent by weight, or not more than 80 percent by weight, or not more than 70 percent by weight, or not more than 60 percent by weight based on total weight of monomers present in the monomeric composition. The amount of vinyl aromatic compound (1) present in the monomeric composition can range between any combination of the recited values, inclusive of the recited values. It will be understood by those skilled in the art that the amount of the vinyl aromatic compound (1) used to prepare the polymeric microparticles is determined by the properties desired to be incorporated into the resulting polymeric microparticles and/or the compositions containing such microparticles.

The one or more carboxylic acid functional, polymerizable, ethylenically unsaturated monomers (2) from which the polymeric microparticles are prepared can comprise any of the ethylenically unsaturated carboxylic acid functional monomers known in the art, including, where applicable, anhydrides thereof. In an embodiment of the present invention, the carboxylic acid functional, polymerizable, ethylenically unsaturated monomer (2) can comprise one or more monomers selected from acrylic acid, methacrylic acid, itaconic acid, fumaric acid, maleic acid, anhydrides thereof (where applicable), and mixtures thereof. Non-limiting examples of anhydrides suitable for use as the one or more carboxylic acid functional, polymerizable, ethylenically unsaturated monomers (2) can include maleic anhydride, fumaric anhydride, itaconic anhydride, methacrylic anhydride, and mixtures thereof.

The one or more carboxylic acid functional, polymerizable, ethylenically unsaturated monomers (2) can be present in the monomeric composition from which the polymeric microparticles are prepared in an amount of 0.1 percent by weight, or at least 0.5 percent by weight, or at least 1 percent by weight, based on total weight of monomers present in the monomeric composition. The carboxylic acid functional, polymerizable, ethylenically unsaturated monomer (2) also can be present in the monomeric composition from which the polymeric microparticles are prepared in an amount of not more than 10 percent by weight, or not more than 8 percent by weight, or not more than 5 percent by weight, based on total weight of monomers present in the monomeric composition. The amount of the one or more carboxylic acid functional, polymerizable, ethylenically unsaturated monomers (2) present in the monomeric composition can range between any combination of the recited values, inclusive of the recited values. It will be understood by those skilled in the art that the amount of the one or more carboxylic acid functional, polymerizable, ethylenically unsaturated monomers (2) used to prepare the polymeric microparticles is determined by the properties desired to be incorporated into the resultant polymeric microparticles and/or the compositions containing such microparticles.

The one or more polymerizable monomer(s) (3) having one or more functional groups which are capable of reacting to form crosslinks can include any of the art recognized polymerizable monomers that have reactive functional groups capable of reacting either during the polymerization process with a mutually reactive functional group(s) present on any of the other monomers present in the monomeric composition, or, alternatively, after the monomer has been polymerized, for example, with mutually reactive functional groups present on one or more of the film-forming composition components. As used herein, "functional groups that are capable of reacting to form crosslinks after polymerization" refer to, for example, functional groups on a first polymer molecule that may react under appropriate conditions to form covalent bonds with mutually reactive functional groups on a second polymer molecule, for example a crosslinking agent molecule, or different polymer molecules present in the film-forming composition.

In an embodiment of the present invention, the one or more polymerizable monomers (3) having functional groups capable of reacting to form crosslinks can comprise any of a variety of reactive functional groups including, but not limited to, those selected from amide groups, hydroxyl groups, amino groups, epoxy groups, thiol groups, isocyanate groups, carbamate groups, and mixtures thereof.

In another embodiment of the present invention, the one or more polymerizable monomer(s) (3) having functional groups which are capable of reacting to form crosslinks can comprise a compound selected from N-alkoxymethyl amides, N-methylolamides, lactones, lactams, mercaptans, hydroxyls, epoxides, and the like. Examples of such monomers include, but are not limited to γ-(meth)acryloxytrialkoxysilane, N-methylol(meth)acrylamide, N-butoxymethyl (meth)acrylamide, (meth)acryliclactones, N-substituted (meth)acrylamide lactones, (meth)acryliclactams, N-substituted (meth)acrylamide lactams, glycidyl (meth)acrylate, allyl glycidyl ether, and mixtures thereof.

The one or more polymerizable monomer(s) (3) having functional groups which are capable of reacting to form crosslinks can be present in the monomeric composition from which the polymeric microparticles are prepared in an amount of 0 percent by weight, or at least 0.5 percent by weight, or at least 1 percent by weight, based on total weight of monomers present in the monomeric composition. The one or more polymerizable monomer(s) (3) having functional groups which are capable of reacting to form crosslinks also can be present in the monomeric composition from which the polymeric microparticles are prepared in an amount of not more than 10 percent by weight, or not more than 8 percent by weight, or not more than 5 percent by weight based on total weight of monomers present in the monomeric composition. The amount of the one or more polymerizable monomer(s) (3) having functional groups which are capable of reacting to form crosslinks present in the monomeric composition can range between any combination of the recited values, inclusive of the recited values. It will be understood by those skilled in the art that the amount of the one or more polymerizable monomer(s) (3) having functional groups which are capable of reacting to form crosslinks used to prepare the polymeric microparticles is determined by the properties desired to be incorporated into the resultant polymeric microparticles and/or the film-forming compositions containing such microparticles.

The one or more polymerizable ethylenically unsaturated monomer (4) can be any of the art recognized ethylenically unsaturated monomers, provided that the polymerizable ethylenically unsaturated monomer (4) is different from any of the aforementioned monomers (1), (2), and (3). Polymerizable ethylenically unsaturated monomers suitable for use as the monomer (4) which are different from the monomers (1), (2) and (3), may include any suitable polymerizable ethylenically unsaturated monomer capable of being polymerized in a emulsion polymerization system and does not substantially affect the stability of the emulsion or the polymerization process.

Suitable polymerizable ethylenically unsaturated monomers can include, but are not limited to, alkyl esters of (meth) acrylic acid such as methyl(meth)acrylate, ethyl(meth)acrylate, propyl(meth)acrylate, N-butyl(meth)acrylate, t-butyl (meth)acrylate, 2-ethylhexyl(meth)acrylate, isobornyl (meth)acrylate, lauryl (meth)acrylate, cyclohexyl (meth) acrylate, and 3,3,5-trimethylcyclohexyl (meth)acrylate.

The one or more polymerizable ethylenically unsaturated monomers (4) also can include hydroxy-functional ethylenically unsaturated monomers, for example, a compound selected from hydroxyethyl (meth)acrylate, hydroxybutyl (meth)acrylate, hydroxypropyl(meth)acrylate, dimethylaminoethyl (meth)acrylate, allyl glycerol ether, methallyl glycerol ether, and mixtures thereof.

As used herein, in the specification and the claims, "(meth) acrylate" and like terms is intended to include both acrylates and methacrylates.

In a one embodiment of the present invention, the one or more polymerizable ethylenically unsaturated monomers (4) can comprise one or more ethylenically unsaturated, beta-hydroxy ester functional monomers. Such monomers can be derived from the reaction of an ethylenically unsaturated acid functional monomer, such as any of the monocarboxylic acids described above, e.g., acrylic acid, and an epoxy compound which does not participate in the free radical initiated polymerization with such unsaturated acid functional monomer. Examples of such epoxy compounds include glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those commercially available from Shell Chemical Company under the tradename CARDURA E; and from Exxon Chemical Company under the tradename GLYDEXX-10. Alternatively, the beta-hydroxy ester functional monomers can be prepared from an ethylenically unsaturated, epoxy functional monomer, for example glycidyl (meth) acrylate and allyl glycidyl ether, and a saturated carboxylic acid, such as a saturated monocarboxylic acid, for example isostearic acid.

The one or more ethylenically unsaturated polymerizable monomers (4) can be present in the monomeric composition from which the polymeric microparticles are prepared in an amount of 0 percent by weight, or at least 0.5 percent by weight, or at least 1 percent by weight, or at least 10 weight percent, or at least 20 weight percent based on total weight of monomers present in the monomeric composition. The one or more ethylenically unsaturated polymerizable monomers (4) also can be present in the monomeric composition from which the polymeric microparticles are prepared in an amount of not more than 60 percent by weight, or not more than 50 percent by weight, or not more than 45 percent by weight, or not more than 40 percent by weight based on total weight of monomers present in the monomeric composition. The amount of the one or more ethylenically unsaturated polymerizable monomers (4) present in the monomeric composition can range between any combination of the recited values, inclusive of the recited values. It will be understood by those skilled in the art that the amount of the one or more ethylenically unsaturated polymerizable monomers (4) used to prepare the polymeric microparticles is determined by the properties desired to be incorporated into the resultant polymeric microparticles and/or the film-forming compositions comprising such microparticles.

In an embodiment of the present invention, the one or more ethylenically unsaturated polymerizable monomers (4) can comprise a crosslinking monomer having two or more sites of reactive unsaturation, or any of the previously mentioned monomers having functional groups capable of reacting to form a crosslink after polymerization. Suitable monomers having two or more sites of reactive unsaturation can include, but are not limited to, one or more of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra (meth)acrylate, glycerol di(meth)acrylate, glycerol allyloxy di(meth)acrylate, 1,1,1-tris(hydroxymethyl)ethane di(meth) acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalte, divinyl benzene, methylol (meth)acrylamide, triallylamine, and methylenebis (meth) acrylamide.

As mentioned above, the aqueous dispersion of polymeric microparticles is prepared by well-known emulsion polymerization techniques. For example the monomeric composition can be prepared by admixing monomer(s) (1), with monomers (2) and/or (3) and/or (4). The monomeric composition is dispersed in the aqueous continuous phase under high shear to form stable monomer droplets and/or micelles as would be expected under typical emulsion polymerization techniques. Emulsifiers, protective colloids, and/or surface active agents as are well known in the art may be included to stabilize or prevent coagulation or agglomeration of the monomer droplets during the polymerization process. The aqueous dispersion is then subjected to radical polymerization conditions to polymerize the monomers within the droplets or micelles.

Suitable emulsifiers and protective colloids include, but are not limited to high molecular weight polymers such as hydroxyethyl cellulose, methyl cellulose, polyacrylic acid, polyvinyl alcohol, and the like. Also, materials such as base-neutralized acid functional polymers can be employed for this purpose. Suitable surface active agents can include any of the well known anionic, cationic or nonionic surfactants or dispersing agents. Mixtures of such materials can be used.

Suitable cationic dispersion agents include, but are not limited to lauryl pyridinium chloride, cetyldimethyl amine acetate, and alkyldimethylbenzylammonium chloride, in which the alkyl group has from 8 to 18 carbon atoms. Suitable anionic dispersing agents include, but are not limited to alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium octylphenoxypolyethoxyethyl sulfate, having 1 to 5 oxyethylene units, and the like. Suitable non-ionic surface active agents include but are not limited to alkyl phenoxypolyethoxy ethanols having alkyl groups of from about 7 to 18 carbon atoms and from about 6 to about 60 oxyethylene units such as, for example, heptyl phenoxypolyethoxyethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections.

A free radical initiator typically is used in the emulsion polymerization process. Any suitable art recognized free radical initiator may be used. Suitable free radical initiators include, but are not limited to thermal initiators, photoinitiators and oxidation-reduction initiators, all of which may be otherwise categorized as being water-soluble initiators or non-water-soluble initiators. Examples of thermal initiators include, but are not limited to azo compounds, peroxides and persulfates. Suitable persulfates include, but are not limited to sodium persulfate and ammonium persulfate. Oxidation-reduction initiators may include, as non-limiting examples persulfate-sulfite systems as well as systems utilizing thermal initiators in combination with appropriate metal ions such as iron or copper.

Suitable azo compounds include, but are not limited to non-water-soluble azo compounds such as 1-1'-azobiscyclohexanecarbonitrile), 2-2'-azobisisobutyronitrile, 2-2'-azobis (2-methylbutyronitrile), 2-2'-azobis(propionitrile), 2-2'-azobis(2,4-dimethylvaleronitrile), 2-2'-azobis(valeronitrile), 2-(carbamoylazo)-isobutyronitrile and mixtures thereof.; and water-soluble azo compounds such as azobis tertiary alkyl compounds include, but are not limited to, 4-4'-azobis(4-cyanovaleric acid), 2-2'-azobis(2-methylpropionamidine) dihydrochloride, 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride and mixtures thereof.

Suitable peroxides include, but are not limited to hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals and mixtures thereof.

In one embodiment of the present invention, the average particle size of the polymeric microparticles may be at least 200 Angstroms, or at least 800 Angstroms, or at least 1000 Angstroms, or at least 1500 Angstroms. The average particle size of the polymeric microparticles can be no more than 10,000 Angstroms, or not more than 8000 Angstroms, or not more than 5000 Angstroms, or not more than 2500 Angstroms. When the average particle size is too large, the microparticles may tend to settle from the latex emulsion upon storage. The average particle size of the polymeric microparticles may be any value or in any range of values inclusive of those stated above.

The average particle size can be measured by photon correlation spectroscopy as described in International Standard ISO 13321. The average particle size values reported herein are measured by photon correlation spectroscopy using a Malvern Zetasizer 3000HSa according to the following procedure. Approximately 10 mL of ultrafiltered deionized water and 1 drop of a homogenous test sample are added to a clean 20 mL vial and then mixed. A cuvet is cleaned and approximately half-filled with ultrafiltered deionized water, to which about 3-6 drops of the diluted sample is added. Once any air bubbles are removed, the cuvet is placed in the Zetasizer 3000HSa to determine if the sample is of the correct concentration using the Correlator Control window in the Zetasizer Software (100 to 400 KCts/sec). Particle size measurements are then made with the Zetasizer 3000HSa.

As used herein, including the claims, the term "dispersion" means that the microparticles are capable of being distributed throughout water as finely divided particles, such as a latex. See *Hawley's Condensed Chemical Dictionary*, (12th Ed. 1993) at page 435, which is hereby incorporated by reference. The uniformity of the dispersion can be increased by the addition of wetting, dispersing or emulsifying agents (surfactants), which are discussed above.

As previously mentioned, the aqueous dispersion of polymeric microparticles prepared by emulsion polymerization described above can be used as a component in a film-forming composition that is substantially free of organic solvent. The aqueous dispersion of polymeric microparticles prepared by emulsion polymerization can be present in the film-forming composition in an amount of at least 1 percent by weight, or at least 2 percent by weight, or at least 5 percent by weight, based on total weight of resin solids present in the film-forming composition. Also, the aqueous dispersion of polymeric microparticles prepared by emulsion polymerization can be present in the film-forming composition in an amount of not more than 20 percent by weight, or not more than 15 percent by weight, or not more than 10 percent by weight. The amount of the aqueous dispersion of polymeric microparticles prepared by emulsion polymerization present in the film-forming composition can range between any combination of these values inclusive of the recited values.

The substantially organic solvent-free film-forming composition of the present invention can be a thermoplastic film-forming composition, or, alternatively, a thermosetting composition. As used herein, by "thermosetting composition" is meant one which "sets" irreversibly upon curing or crosslinking, wherein the polymer chains of the polymeric components are joined together by covalent bonds. This property is usually associated with a cross-linking reaction of the composition constituents often induced, for example, by heat or radiation. Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting composition will not melt upon the application of heat and is insoluble in solvents. By contrast, a "thermoplastic composition" comprises polymeric components which are not joined by covalent bonds and thereby can undergo liquid flow upon heating and are soluble in solvents. Saunders, K. J., Organic Polymer Chemistry, pp. 41-42, Chapman and Hall, London (1973).

In an embodiment of the present invention the film-forming composition comprises, in addition to the aqueous dispersion of polymeric microparticles prepared by emulsion polymerization, any of the second aqueous dispersions of polymeric microparticles described below.

In an embodiment of the present invention, the film-forming composition comprises a thermosetting composition which comprises, in addition to the aqueous dispersion of polymeric microparticles prepared by emulsion polymerization described in detail above, a resinous binder system typically comprising (a) at least one reactive functional group-containing polymer, and (b) at least one crosslinking agent having functional groups reactive with the functional groups of the polymer. The functional groups of the crosslinking agent also may be reactive with any reactive functional groups present in the above-described polymeric microparticles.

The functional group-containing polymer (a) can comprise any of a variety of reactive group-containing polymers well known in the surface coatings art provided the polymer is sufficiently dispersible in aqueous media. Suitable non-limiting examples can include acrylic polymers, polyester polymers, polyurethane polymers, polyether polymers, polysiloxane polymers, polyepoxide polymers, copolymers thereof, and mixtures thereof. Also, the polymer (a) can comprise a variety of reactive functional groups, for example, functional groups selected from at least one of hydroxyl groups, carboxyl groups, epoxy groups, amino groups, amido groups, carbamate groups, isocyanate groups, and combinations thereof.

For example, suitable hydroxyl group-containing polymers can include acrylic polyols, polyester polyols, polyurethane polyols, polyether polyols, and mixtures thereof.

Suitable hydroxyl group and/or carboxyl group-containing acrylic polymers can be prepared from polymerizable ethylenically unsaturated monomers and are typically copolymers of (meth)acrylic acid and/or hydroxyalkyl esters of (meth)acrylic acid with one or more other polymerizable ethylenically unsaturated monomers such as alkyl esters of (meth)acrylic acid including methyl (meth)acrylate, ethyl (meth)acrylate, butyl (meth)acrylate and 2-ethyl hexylacrylate, and vinyl aromatic compounds such as styrene, alpha-methyl styrene, and vinyl toluene.

In a one embodiment of the present invention, the acrylic polymer can be prepared from ethylenically unsaturated, beta-hydroxy ester functional monomers. Such as those described above.

Epoxy functional groups can be incorporated into the acrylic polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6, incorporated herein by reference.

Carbamate functional groups can be incorporated into the acrylic polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328, incorporated herein by reference. Carbamate functional groups can also be incorporated into the acrylic polymer by reacting a hydroxyl functional acrylic polymer with a low molecular weight alkyl carbamate such as methyl carbamate. Pendant carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The polymers prepared from polymerizable ethylenically unsaturated monomers can be prepared by solution polymerization techniques, which are well-known to those skilled in the art, in the presence of suitable catalysts such as organic peroxides or azo compounds, for example, benzoyl peroxide or N,N-azobis(isobutyronitrile). The polymerization can be carried out in an organic solution in which the monomers are soluble by techniques conventional in the art. Alternatively, these polymers can be prepared by aqueous emulsion or dispersion polymerization techniques which are well-known in the art. The ratio of reactants and reaction conditions are selected to result in an acrylic polymer with the desired pendent functionality.

Polyester polymers are also useful in the film-forming compositions of the invention. Useful polyester polymers typically include the condensation products of polyhydric alcohols and polycarboxylic acids. Suitable polyhydric alcohols can include ethylene glycol, neopentyl glycol, trimethylol propane, and pentaerythritol. Suitable polycarboxylic acids can include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and include those derived from linseed oil, soya bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters are those described in U.S. Pat. No. 5,593,733 at column 2, line 40 to column 4, line 9, incorporated herein by reference.

Polyurethane polymers containing terminal isocyanate or hydroxyl groups also can be used as the polymer (d) in the coating compositions of the invention. The polyurethane polyols or NCO-terminated polyurethanes which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates include those described in U.S. Pat. No. 4,046,729 at column 5, line 26 to column 6, line 28, incorporated herein by reference. Examples of suitable polyols include those described in U.S. Pat. No. 4,046,729 at column 7, line 52 to column 10, line 35, incorporated herein by reference. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Examples of suitable polyisocyanates are aromatic isocyanates, such as 4,4'-diphenylmethane diisocyanate, 1,3-phenylene diisocyanate and toluene diisocyanate, and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate also can be employed.

Examples of suitable polyether polyols include polyalkylene ether polyols such as those having the following structural formulas (II):

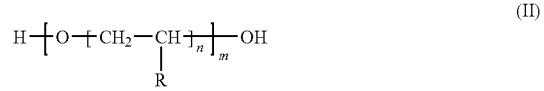

(II)

wherein the substituent R is hydrogen or a lower alkyl group containing from 1 to 5 carbon atoms including mixed substituents, and n has a value typically ranging from 2 to 6 and m has a value ranging from 8 to 100 or higher. Exemplary polyalkylene ether polyols include poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E.I. Du Pont de Nemours and Company, Inc.

Generally, the polymers having reactive functional groups which are useful in the film-forming compositions of the present invention can have a weight average molecular weight (Mw) typically ranging from 1000 to 20,000, or from 1500 to 15,000 or from 2000 to 12,000 as determined by gel permeation chromatography using a polystyrene standard.

In one embodiment of the present invention, the polymer (a) is in the form of a second aqueous dispersion comprising polymeric microparticles, which are adapted to react with a crosslinking agent.

In certain embodiments of the invention, the amount of the second aqueous dispersion resin solids present in the film-forming composition can be at least 20 weight percent, or, in some embodiments, at least 30 weight percent, or, in yet other embodiments, at least 40 weight percent based on the total resin solids weight of the film-forming composition. In certain embodiments of the invention, the amount of the second aqueous dispersion of polymeric microparticles resin solids present in the film-forming composition also can be no more than 90 weight percent, or, in some embodiments, no more than 85 weight percent, or, in yet other embodiments, no more than 80 weight percent based on the weight of total resin solids present in the film-forming composition. The amount of the second aqueous dispersion of polymeric microparticles present in the film-forming composition can range between any combination of these values inclusive of the recited values. The solids content is determined by heating a sample of the composition to 105° to 110° C. for 1 to 2 hours to drive off the volatile material, and subsequently measuring relative weight loss.

In certain embodiments of the present invention, the second aqueous dispersion of polymeric microparticles can be prepared from (i) at least one polymer having reactive functional groups, typically a substantially hydrophobic polymer; and (ii) at least one crosslinking agent, typically a substantially hydrophobic crosslinking agent, containing functional groups which are reactive with the functional groups of the polymer. Suitable substantially hydrophobic polymers can be prepared by polymerizing one or more ethylenically unsaturated carboxylic acid functional group-containing monomers and one or more other ethylenically unsaturated monomers free of acid functionality, e.g., an ethylenically unsaturated monomer having hydroxyl and/or carbamate functional groups. Suitable substantially hydrophobic crosslinking agents can include, for example, polyisocyanates, blocked polyisocyanates and aminoplast resins. Suitable aqueous dispersions of polymeric microparticles include those described in detail in U.S. Pat. No. 6,462,139 at column 4, line 17 to column 11, line 49, which is incorporated herein by reference.

As used herein, including the claims, the term "substantially hydrophobic" means that the hydrophobic component is essentially not compatible with, does not have an affinity for and/or is not capable of dissolving in water using conventional mixing means. That is, upon mixing a sample of the hydrophobic component with an organic component and water, a majority of the hydrophobic component is in the organic phase and a separate aqueous phase is observed. See *Hawley's Condensed Chemical Dictionary*, (12th ed. 1993) at page 618.

In certain embodiments of the present invention, the second aqueous dispersion of polymeric microparticles can be prepared from (1) one or more reaction products of ethylenically unsaturated monomers, at least one of which contains at least one acid functional group, (2) one or more polymers different from (1) and (3), typically containing reactive functional groups, which are typically substantially hydrophobic polymers, and (3) one or more crosslinking agents, typically substantially hydrophobic crosslinking agents, having functional groups reactive with those of the reaction product (1) and/or the polymer (2). The polymer (2) can be any of the well-known polymers such as acrylic polymers, polyester polymers, alkyd polymers, polyurethane polymers, polyether polymers, polyurea polymers, polyamide polymers, polycarbonate polymers, copolymers thereof and mixtures thereof. Suitable substantially hydrophobic crosslinking agents include, for example, polyisocyanates, blocked polyisocyanates and aminoplast resins. Suitable aqueous dispersions of polymeric microparticles include those described in detail in U.S. Pat. No. 6,329,060 at column 4, line 27 to column 17, line 6, which is incorporated herein by reference.

In a further embodiment of the present invention, the second aqueous dispersion of polymeric microparticles can be prepared from components (A) at least one functional group-containing reaction product of polymerizable, ethylenically unsaturated monomers; and (B) at least one reactive organopolysiloxane. The components from which the polymeric microparticles can be prepared may further include (C) at least one substantially hydrophobic crosslinking agent.

The reactive organopolysiloxane (B) typically comprises at least one of the following structural units (III):

where m and n each represent a positive number fulfilling the requirements of: $0<n<4$; $0<m<4$; and $2\leq(m+n)<4$; $R^1$ represents H, OH or monovalent hydrocarbon groups; and $R^2$ represents a monovalent reactive functional group-containing organic moiety. In a particular embodiment of the present invention, $R^2$ represents a reactive group-containing moiety selected from at least one of hydroxyl, carboxylic acid, isocyanate and blocked isocyanate, primary amine, secondary amine, amide, carbamate, urea, urethane, alkoxysilane, vinyl and epoxy functional groups. Suitable aqueous dispersions of polymeric microparticles include those described in detail in U.S. Pat. No. 6,387,997 at column 3, line 47 to column 14, line 54, which is incorporated herein by reference.

In an embodiment of the present invention, any of the previously described film-forming compositions can further include at least one first water dilutable additive comprising the reaction product of (i) a reactant comprising at least one isocyanate functional group with (ii) an active hydrogen containing alkoxypolyalkylene. As used herein, including the claims, the term "water dilutable" means that the additive is or has been adapted to be water soluble or water dispersable.

The isocyanates which are useful as reactant (i) in preparing the first water dilutable additive can include both monoisocyanates or polyisocyanates, or a mixture thereof. Illustrative of the monoisocyanates are ethylenically unsaturated polymerizable monomers containing an isocyanato group. Illustrative of these monoisocyanates are isocyanato alkyl esters of ethylenically unsaturated carboxylic acids such as vinyl isocyanates, allyl isocyanates, allyloxyalkyl isocyanates and styryl isocyanates. Representative examples are 2-isocyanato ethyl acrylate, 2-isocyanato ethyl methacrylate, propenyl isocyanate, and 9-decenyl isocyanate.

Polyisocyanates useful herein for this purpose include both aliphatic and aromatic isocyanates. Representative examples include, without limitation, the aliphatic isocyanates such as trimethylene, tetramethylene, pentamethylene, hexamethylene, 1,2-propylene, 1,2-butylene, 2,3-butylene, and 1,3-butylene diisocyanates; the cycloalkylene compounds such as 1,3-cyclopentane, 1,4-cyclohexane, 1,2-cyclohexane diisocyanates and isophorone diisocyanates; the aromatic compounds such as m-phenylene, p-phenylene, 4,4'-diphenyl, 1,5-napthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-dimethyldiphenyl methane-2,2',5,5'-tetraisocyanate; the polymerized polyisocyanates such as tolylene diisocyanate dimers and trimers, and the like.

In addition, the polyisocyanates may be prepolymers derived from polyols such as polyether polyols or polyester polyols, including polyols which are reacted with excess polyisocyanates, such as mentioned above, to form isocyanate-terminated prepolymers. Examples of the suitable isocyanate prepolymers are described in U.S. Pat. No. 3,799,854, column 2, lines 22 to 53, which is herein incorporated by reference.

The active hydrogen containing alkoxypolyalkylenes which are useful as reactant (ii) in preparing the water dilutable additive of the present invention include alkoxyethylene glycols, such as, for example, methoxypolyethylene glycol, and butoxypolyethylene glycol. Also suitable for use as reactant (ii) are polyalkoxyalkylene amines, including polyoxyalkylene monoamines, and polyocyalkylene polyamines, for example, polyoxyalkylene diamine and polyoxyalkylene polyamines. Specific non-limiting examples of suitable polyoxyalkylene polyamines include polyoxypropylene diamines commercially available under the tradenames JEFFAMINE® D-2000 and JEFFAMINE® D-400 from Huntsman Corporation of Houston, Tex. Mixed polyoxyalkylene polyamines, that is, those in which the oxyalkylene group can be selected from more than one moiety, also can be used as reactant (ii).

According to certain embodiments of the present invention, the first water dilutable additive can be present in the film forming composition in an amount ranging from 0 up to 10 percent by weight, or in an amount ranging from 1 up to 8 percent by weight, or, in yet other embodiments, in an amount ranging from 2 up to 7 percent by weight based on total weight of resin solids present in the film-forming composition.

In certain embodiments of the present invention, the film-forming composition can further include, in addition to the components described above, at least one second water dilutable additive which is different from the first water dilutable additive described above. The second water dilutable additive comprises a reactive functional group-containing polysiloxane, for example, hydroxyl, carboxylic acid and amine functional group-containing polysiloxanes.

In accordance with certain embodiments of the present invention, the film-forming composition can include at least one water dilutable carboxylic acid functional group-containing polysiloxane, such as a polysiloxane having the following general structure:

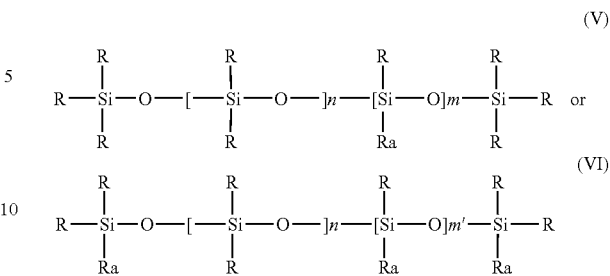

where m is at least 1; m' is 0 to 50; n is 0 to 50; R is selected from the group consisting of OH and monovalent hydrocarbon groups connected to the silicon atoms; Ra has the following structure:

wherein $R^1$ is alkylene, oxyalkylene or alkylene aryl; and at least one X contains one or more COOH functional groups.

The acid functional polysiloxane can be prepared, for example, by reacting (a) a polysiloxane polyol; and (b) at least one carboxylic acid functional material or anhydride. The resulting acid functional polyol is further neutralized with, for example, amine, to render the reaction product water dilutable.

Examples of anhydrides suitable for use in the present invention as reactant (b) immediately above include hexahydrophthalic anhydride, methyl hexahydrophthalic anhydride, phthalic anhydride, trimellitic anhydride, succinic anhydride, chlorendic anhydride, alkenyl succinic anhydride and substituted alkenyl succinic anhydride, and mixtures thereof.

According to certain embodiments of the present invention, the second water dilutable additive comprising a functional group-containing polysiloxane is present in the film-forming composition in an amount ranging from 0.1 up to 10.0 weight percent based on total weight of resin solids present in the film-forming composition, or in an amount ranging from 0.1 up to 5.0 weight percent or, in yet other embodiments, in an amount ranging from 0.1 to 1.0 weight percent based on the weight of total solids present in the film-forming composition.

As previously mentioned, in certain embodiments of the present invention, the film-forming composition may also comprise (b) one or more crosslinking agents that are adapted to react with the functional groups of the polymer and/or any of the previously mentioned polymeric microparticles and/or additives to provide curing, if desired, for the film-forming composition. Non-limiting examples of suitable crosslinking agents include any of the aminoplasts and polyisocyanates as are well known in the surface coatings art, provided that the crosslinking agent(s) are adapted to be water soluble or water dispersible as described below, and polyacids, polyanhydrides and mixtures thereof. When used, selection of the crosslinking agent or mixture of crosslinking agents is dependent upon the functionality associated with the polymeric microparticles, such as hydroxyl and/or carbamate functionality. When, for example, the functionality is hydroxyl, the hydrophilic crosslinking agent may be an aminoplast or polyisocyanate crosslinking agent.

Examples of aminoplast resins suitable for use as the crosslinking agent include those containing methylol or similar alkylol groups, a portion of which have been etherified by reaction with a lower alcohol, such as methanol, to provide a water soluble/dispersible aminoplast resin. One appropriate aminoplast resin is the partially methylated aminoplast resin, CYMEL® 385, which is commercially available from Cytec Industries, Inc. An example of a blocked isocyanate which is water soluble/dispersible and suitable for use as the crosslinking agent is dimethyl pyrazole blocked hexamethylene diisocyanate trimer commercially available as BI 7986 from Baxenden Chemicals, Ltd. in Lancashire, England.

Polyacid crosslinking materials suitable for use in the present invention can include, for example, those that on average generally contain greater than one acid group per molecule, sometimes three or more and sometimes four or more, such acid groups being reactive with epoxy functional film-forming polymers. Polyacid crosslinking materials may have di-, tri- or higher functionalities. Suitable polyacid crosslinking materials which can be used include, for example, carboxylic acid group-containing oligomers, polymers and compounds, such as acrylic polymers, polyesters, and polyurethanes and compounds having phosphorus-based acid groups.

Examples of suitable polyacid crosslinking agents include, for example, ester group-containing oligomers and compounds including half-esters formed from reacting polyols and cyclic 1,2-acid anhydrides or acid functional polyesters derived from polyols and polyacids or anhydrides. These half-esters are of relatively low molecular weight and are quite reactive with epoxy functionality. Suitable ester group-containing oligomers includes those described in U.S. Pat. No. 4,764,430, column 4, line 26 to column 5, line 68, which is hereby incorporated by reference.

Other useful crosslinking agents include acid-functional acrylic crosslinkers made by copolymerizing methacrylic acid and/or acrylic acid monomers with other ethylenically unsaturated copolymerizable monomers as the polyacid crosslinking material. Alternatively, acid-functional acrylics can be prepared from hydroxy-functional acrylics reacted with cyclic anhydrides.

In accordance with certain embodiments of the present invention, the crosslinking agent (b) which typically is water soluble/dispersible, may be present as a component in the film-forming composition in an amount ranging from 0 to at least 10 weight percent, or at least 10 to at least 20 weight percent, or from at least 20 to at least 30 weight percent based on total resin solids weight in the film-forming composition. In accordance with certain embodiments of the present invention, the crosslinking agent may be present as a component in the film-forming composition in an amount ranging from less than or equal to 70 to less than or equal to 60 weight percent, or less than or equal to 60 to less than or equal to 50 weight percent, or less than or equal to 50 to less than or equal to 40 weight percent based on total resin solids weight of the film-forming composition. The crosslinking agent can be present in the film-forming composition in an amount ranging between any combination of these values inclusive of the recited ranges The film-forming composition can contain, in addition to the components described above, a variety of other adjuvant materials such as those described below. If desired, other resinous materials can be utilized in conjunction with the previously described ingredients so long as the resultant coating composition is not detrimentally affected in terms of application, physical performance and appearance properties.

The film-forming composition of the present invention can further include inorganic and/or inorganic-organic particles, for example, silica, alumina, including treated alumina (e.g. silica-treated alumina known as alpha aluminum oxide), silicon carbide, diamond dust, cubic boron nitride, and boron carbide.

In addition, in accordance with certain additional embodiments of the present invention, inorganic particles which may, for example, be substantially colorless, such as silica, for example, colloidal silica, can be present. Such materials may provide enhanced mar and scratch resistance. Other suitable inorganic particles can include fumed silica, amorphous silica, alumina (i.e., aluminum oxide), colloidal alumina, titanium dioxide, zirconia, colloidal zirconia and mixtures thereof. Such particles can have an average particle size ranging from sub-micron size (e.g., nanosized particles) up to 10 microns depending upon the end use application of the composition and the desired effect.

In an embodiment of the invention, the particles comprise inorganic particles that have an average particle size ranging from 1 to 10 microns, or 1 to 5 microns prior to incorporation into the composition. In another embodiment of the present invention, the inorganic particles comprise aluminum oxide having an average particle size ranging from 1 to 5 microns prior to incorporation into the film-forming composition.

In a further embodiment of the invention, the inorganic particles have an average particle size of less than 50 microns prior to incorporation into the composition. In another embodiment, the present invention is directed to film-forming compositions as previously described wherein the inorganic particles have an average particle size ranging from 1 to less than 1000 nanometers prior to incorporation into the composition. In another embodiment, the present invention is directed to film-forming compositions as previously described wherein the inorganic particles have an average particle size ranging from 1 to 100 nanometers prior to incorporation into the composition.

In another embodiment, the present invention is directed to film-forming compositions as previously described wherein the inorganic particles have an average particle size ranging from 5 to 50 nanometers prior to incorporation into the composition. In another embodiment, the present invention is directed to film-forming compositions as previously described wherein the inorganic particles have an average particle size ranging from 5 to 25 nanometers prior to incorporation into the composition. The particle size may range between any combination of these values inclusive of the recited values. These materials may constitute, in certain embodiments of the present invention, up to 30 percent by weight of the total weight of the film-forming composition.

In a further embodiment of the present invention, the particles, which are typically inorganic particles, can be present in the composition in an amount ranging from 0.05 to 5.0 weight percent, or from 0.1 to 1.0 weight percent, or from 0.1 to 0.5 weight percent based on total weight of the film-forming composition. The amount of particles present in the composition can range between any combination of these values inclusive of the recited values.

The film-forming composition also can contain a catalyst to accelerate the cure reaction, for example, between the blocked polyisocyanate curing agent and the reactive hydroxyl groups of the aqueous dispersion(s) of polymeric microparticles. Examples of suitable catalysts include organotin compounds such as dibutyl tin dilaurate, dibutyl tin oxide and dibutyl tin diacetate. Catalysts suitable for promoting the cure reaction between an aminoplast curing agent and the reactive hydroxyl and/or carbamate functional groups of the thermosettable dispersion include acidic materials, for example, acid phosphates such as phenyl acid phosphate, and substituted or unsubstituted sulfonic acids such as dodecyl-benzene sulfonic acid or paratoluene sulfonic acid. The catalyst usually is present in an amount ranging from 0.1 to 5.0 percent by weight, or 0.5 to 1.5 percent by weight, based on the total weight of resin solids present in the film-forming composition Other additive ingredients, for example, plasticizers, surfactants, thixotropic agents, anti-gassing agents, flow controllers, anti-oxidants, UV light absorbers and similar additives conventional in the art can be included in the composition. These ingredients typically are present in an amount of up to about 40 percent by weight based on the total weight of resin solids.

In certain embodiments of the present invention, the film-forming composition forms a generally continuous film at ambient temperature (approximately 23-28° C. at 1 atm pressure). A "generally continuous film" is formed upon coalescence of the applied coating composition to form a uniform coating upon the surface to be coated. By "coalescence" is meant the tendency of individual particles or droplets of the coating composition, such as would result upon atomization of a liquid coating when spray applied, to flow together thereby forming a continuous film upon the substrate which is substantially free from voids or areas of very thin film thickness between the coating particles.

The film-forming compositions of the present invention also may, in certain embodiments, be formulated to include one or more pigments or fillers to provide color and/or optical effects, or opacity. Such pigmented film-forming compositions may be suitable for use in multi-component composite coatings as discussed below, for example, as a primer coating or as pigmented base coating composition in a color-plus-clear topcoat system, or as a monocoat topcoat. In an embodiment of the present inventions the film-forming composition is a pigment-containing primer coating composition suitable for subsequent application of one or more of the previously mentioned topcoats.

The solids content of the film-forming composition generally ranges from 20 to 75 weight percent, or 30 to 65 weight percent, or 40 to 55 weight percent on a basis of total weight of the film-forming composition.

As aforementioned the present invention also is directed to multi-layer composite coatings. The multi-layer composite coating of the present invention can comprise a base coat formed from a base-coat film-forming composition (typically a pigmented color coat), and a top coat formed from a top coat film-forming composition applied over the base coat (typically a transparent or clear coat). At least one of the basecoat film-forming composition and the topcoat film-forming composition comprises the film-forming composition of the present invention. The film-forming composition of the base coat can be any of the compositions useful in coatings applications, including any of the previously described film-forming compositions in accordance with the present invention. The film-forming composition of the base coat comprises a resinous binder and, optionally, a pigment to act as the colorant. Particularly useful resinous binders are acrylic polymers, polyesters, including alkyds and polyurethanes such as those discussed in detail above.

The resinous binders for the base coat can be organic solvent-based materials such as those described in U.S. Pat. No. 4,220,679, note column 2 line 24 continuing through column 4, line 40, which is incorporated herein by reference. Also, water-based coating compositions such as those described in U.S. Pat. No. 4,403,003, U.S. Pat. No. 4,147,769 and U.S. Pat. No. 5,071,904 (incorporated herein by reference) can be used as the binder in the base coat composition.

The base coat composition can contain pigments as colorants as indicated above. Suitable metallic pigments include aluminum flake, copper or bronze flake and metal oxide coated mica. Besides the metallic pigments, the base coat compositions can contain non-metallic color pigments conventionally used in surface coatings including inorganic pigments such as titanium dioxide, iron oxide, chromium oxide, lead chromate, and carbon black; and organic pigments such as, e.g., phthalocyanine blue and phthalocyanine green.

Optional ingredients in the base coat composition include those which are well known in the art of formulating surface coatings, such as surfactants, flow control agents, thixotropic agents, fillers, anti-gassing agents, organic co-solvents, catalysts, and other customary auxiliaries. Examples of these materials and suitable amounts are described in U.S. Pat. Nos. 4,220,679, 4,403,003, 4,147,769 and 5,071,904, which are incorporated herein by reference.

The base coat compositions can be applied to the substrate by any conventional coating technique such as brushing, spraying, dipping or flowing, but they are most often applied by spraying. The usual spray techniques and equipment for air spraying, airless spray and electrostatic spraying in either manual or automatic methods can be used.

During application of the base coat to the substrate, the film thickness of the base coat formed on the substrate is typically 0.1 to 5 mils (about 2.54 to about 127 micrometers), or sometimes 0.1 to 2 mils (about 2.54 to about 50.8 micrometers).

After forming a film of the base coat on the substrate, the base coat can be cured or alternately given a drying step in which solvent is driven out of the base coat film by heating or an air drying period before application of the clear coat. Suitable drying conditions will depend on the particular base coat composition, and on the ambient humidity if the composition is water-borne, but often, a drying time of from 1 to 15 minutes at a temperature of 75° to 200° F. (21° to 93° C.) will be adequate.

The solids content of the base coating composition generally ranges from 15 to 60 weight percent, and sometimes 20 to 50 weight percent.

The topcoat (or clear coat if the transparent coating in a color-plus-clear-system) composition is often applied to the base coat by spray application, however, the topcoat can be applied by any conventional coating technique as described above. Any of the known spraying techniques can be used such as compressed air spraying, electrostatic spraying and either manual or automatic methods. As mentioned above, the topcoat can be applied to a cured or to a dried base coat before the base coat has been cured. In the latter instance, the two coatings are then heated to cure both coating layers simultaneously. Typical curing conditions range from 265° to 350° F. (129° to 175° C.) for 20 to 30 minutes. The clear coating thickness (dry film thickness) is typically 1 to 6 mils (about 25.4 to about 152.4 micrometers).

During application of the top coating composition to the base coated substrate, ambient relative humidity generally can range from about 30 to about 80 percent, preferably about 50 percent to 70 percent.

In an alternative embodiment, after the base coat is applied (and cured, if desired), multiple layers of top coatings (e.g. clear coatings) can be applied over the base coat. This is generally referred to as a "clear-on-clear" application. For example, one or more layers of a conventional transparent or clear coat can be applied over the base coat and one or more layers of transparent coating of the present invention applied thereon. Alternatively, one or more layers of a transparent coating of the present invention can be applied over the base coat as an intermediate topcoat, and one or more conventional transparent coatings applied thereover.

The multi-layer composite coating compositions can be applied over virtually any substrate including wood, metals, glass, cloth, plastic, foam, including elastomeric substrates and the like. They are particularly useful in applications over metals and elastomeric substrates that are utilized in the manufacture of motor vehicles. The substantially organic solvent-free film-forming compositions of the present invention provide multi-component composite coating systems that have appearance and performance properties commensurate with those provided by solvent-based counterparts with appreciably less volatile organic emissions during application.

Illustrating the invention are the following examples, which, however, are not to be considered as limiting the invention to their details. Unless otherwise indicated, all parts and percentages in the following examples, as well as throughout the specification, are by weight.

EXAMPLES

The following Examples A and B describe the preparation of resinous binders for use in the preparation of film-forming compositions of the present invention. Example C describes the preparation of water-dilutable additive materials for use in compositions of the present invention. Example D describes the preparation of a functional polysiloxane additive for use in compositions of the present invention. Example E describes the preparation of aqueous dispersions of polymeric microparticles prepared by emulsion polymerization for use in the preparation of compositions of the present invention. Examples F and G describes the preparation of film-forming compositions of the present invention that include materials prepared in Examples A, C and D. Example H describes the preparation of film-forming compositions of the present invention that include materials prepared in Examples B, C, D, and E.

Example A

Resinous Binder A

A resinous binder was prepared as described below from the ingredients of Table 1. The amounts listed are the total parts by weight in grams and the amount within parenthesis are total parts by weight based on solids, in grams.

TABLE 1

| Ingredient | Amount |
|---|---|
| Charge 1 | |
| Acrylic[1] | 2316.2 (1466.2) |
| TRIXENE DP9B/1504[2] | 299.2 (209.5) |
| MIBK[3] | 53.7 (0) |
| Charge 2 | |
| TINUVIN 400[4] | 73.9 (62.8) |
| TINUVIN 123[5] | 20.9 (20.9) |
| BYK-390[6] | 20.9 (10.5) |
| Polybutylacrylate[7] | 10.5 (6.3) |
| Dibutyltin Dilaurate | 4.8 (4.8) |
| Dimethyl Ethanolamine | 26.3 (0) |
| SURFYNOL 2502[8] | 14.7 (14.7) |
| Charge 3 | |
| MIBK | 53.7 (0) |

TABLE 1-continued

| Ingredient | Amount |
|---|---|
| Charge 4 | |
| Dimethyl Ethanolamine | 6.6 (0) |
| Deionized Water | 3022.0 (0) |
| Charge 5 | |
| Deionized Water | 100.0 (0) |
| Charge 6 | |
| FOAM KILL 649[9] | 1.7 (1.7) |

[1]Acrylic resin (30.3% styrene, 19.9% hydroxyethyl methacrylate, 28.7% CARDURA E (glycidyl neodecanoate available from Shell Chemical Co.), 11.0% acrylic acid, and 10.15% 2-ethylhexyl acrylate).
[2]Blocked isocyanate available from Baxenden Chemical Ltd., Lancashire, England.
[3]Methyl isobutyl ketone.
[4]Light stabilizer available from Ciba Specialty Chemicals, Basel, Switzerland.
[5]Light stabilizer available from Ciba Specialty Chemicals, Basel, Switzerland.
[6]Acrylate leveling additive available from BYK-Chemie USA Inc., Wallingford, Connecticut
[7]60% solids in styrene.
[8]Surfactant available from Air Products and Chemicals, Inc., Allentown, Pennsylvania.
[9]Defoamer available from Crucible Chemical.

Charge 1 and then charge 2 were added to a flask at ambient conditions and mixed until homogeneous. The temperature was increased to 25° C. At that temperature, the mixture was added to a flask containing charge 4, by dripping the mixture into the flask over one hour. Charge 3 was then added to the flask and the contents were held for 30 minutes. The resulting pre-emulsion was passed once through a Microfluidizer® M110T (available from Microfluidics Corp., Newton, Mass.) at 11,500 psi with cooling water to maintain the pre-emulsion at approximately room temperature. Charge 5 was then passed through the Microfluidizer to rinse. Solvents were removed by vacuum distillation. The final composition contained about 46 weight % solids with Charge 6 being added as needed during vacuum distillation.

Example B

Resinous Binder B

A resinous binder was prepared as described below from the ingredients of Table 2. The amounts listed are the total parts by weight in grams and the amount within parenthesis are total parts by weight based on solids, in grams.

TABLE 2

| Ingredient | Amount |
|---|---|
| Charge 1 | |
| Acrylic[10] | 2182.8 (1382.4) |
| Crosslinker[11] | 145.7 (126.8) |
| Flex Acrylic[12] | 330.0 (250.8) |
| MIBK | 47.3 (0) |
| Charge 2 | |
| TINUVIN 400 | 54.7 (46.5) |
| TINUVIN 123 | 18.6 (18.6) |
| BYK-337[13] | 0.4 (0.1) |
| DiMethyl Ethanolamine | 36.7 (0) |
| Dimethyl Ethanolamine | 5.4 (0) |
| SURFYNOL 2502 | 13.8 (13.8) |

TABLE 2-continued

| Ingredient | Amount |
|---|---|
| Charge 3 | |
| MIBK | 47.3 (0) |
| Charge 4 | |
| Dimethyl Ethanolamine | 9.2 (0) |
| Deionized Water | 3151.0 (0) |
| Charge 5 | |
| Deionized Water | 88.0 (0) |
| Charge 6 | |
| FOAM KILL 649[9] | 1.5 (1.5) |

[10]Acrylic resin (28.67% styrene, 19.9% hydroxyethyl methacrylate, 28.6% CARDURA E (glycidyl neodecanoate available from Shell Chemical Co.), 12.75% acrylic acid, and 10.15% 2-ethylhexyl acrylate).
[11]Blocked isocyanate (87% solids in MIBK) produced by charging 1930.0 parts by weight DESMODUR N3300 (a trimer of hexamethylene diisocyanate available from Bayer Corporation) to a reactor containing 1.75 parts by weight dibutyltin dilaurate and 436.8 parts by weight MIBK. 540.7 parts by weight of benzyl alcohol was then added over 90 minutes keeping the temperature below 80° C. After completion of this addition, the reaction temperature was maintained at 80° C. and monitored by infrared spectroscopy for disappearance of the isocyanate band.
[12]Acrylic resin (31.4% CARDURA E (glycidyl neodecanoate available from Shell Chemical Co.), 5.5% isostearic acid, 12.2% methyl methacrylate, 10.3% styrene, 17.1% 2-ethylhexyl acrylate, 12.9% hydroxyethyl acrylate, 10.6% acrylic acid).
[13]Solution of a polyether modified poly-dimethyl-siloxane available from BYK-Chemie USA Inc., Wallingford, Connecticut.

Charge 1 and then charge 2 were added to a flask at ambient conditions and mixed until homogeneous. The temperature was increased to 25° C. At that temperature, the mixture was added to a flask containing charge 4, by dripping the mixture into the flask over one hour. Charge 3 was then added to the flask and the contents were held for 30 minutes. The resulting pre-emulsion was passed once through a Microfluidizer® M110T (available from Microfluidics Corp., Newton, Mass.) at 11,500 psi with cooling water to maintain the pre-emulsion at approximately room temperature. Charge 5 was then passed through the Microfluidizer to rinse. Solvents were removed by vacuum distillation. The final composition contained about 46 weight % solids with Charge 6 being added as needed during vacuum distillation.

Example C

Water Dilutable Additive C

Table 3 sets forth the components and amounts for various water dilutable additives C1 through C12 that were prepared as described below.

TABLE 3

| Example No. | Isocyanate Type | Isocyanate Equivalents | Methoxypoly-ethyelene Glycol Type | Polyethylene Glycol Equivalents |
|---|---|---|---|---|
| C1 | IPDI[14] | 1.0 | MPEG 2000[20] | 1.004 |
| C2 | IPDI | 1.0 | MPEG 750[21] | 1.004 |
| C3 | IPDI | 1.0 | MPEG 550[22] | 1.004 |
| C4 | IPDI | 1.0 | MPEG 350[23] | 1.004 |
| C5 | TDI[15] | 1.0 | MPEG 2000 | 1.004 |
| C6 | m-TMXDI[16] | 1.0 | MPEG 2000 | 1.004 |
| C7 | HDI[17] | 1.0 | MPEG 2000 | 1.004 |
| C8 | HDI Trimer[18] | 1.0 | MPEG 2000 | 1.004 |
| C9 | IPDI Trimer[19] | 1.0 | MPEG 2000 | 1.004 |
| C10 | IPDI | 1.0 | MPEG 2000/ MPEG 750 | 0.502/0.502 |
| C11 | IPDI | 1.0 | MPEG 2000/ MPEG 550 | 0.502/0.502 |
| C12 | IPDI | 1.0 | MPEG 2000/ MPEG 350 | 0.502/0.502 |

[14]Isophorone Diisocyanate.
[15]Toluene Diisocyanate.
[16]META-Tetramethylxylylene Diisocyanate commercially available from CYTEC Industries, Inc.
[17]Hexamethylene Diisocyanate.
[18]DEMODUR 3390 commercially available from Bayer Corporation.
[19]T-1890L commercially available from DeGussa Corporation.
[20]CARBOWAX MPEG 2000 commercially available from The Dow Chemical Company.
[21]CARBOWAX MPEG 750 commercially available from The Dow Chemical Company.
[22]CARBOWAX MPEG 550 commercially available from The Dow Chemical Company.
[23]CARBOWAX MPEG 350 commercially available from The Dow Chemical Company.

In each case, the isocyanate, the polyethylene glycol, and methyl isobutyl ketone were charged to a glass reactor equipped with an agitator, condenser, thermocouple, and nitrogen blanket. The charge was heated to a temperature 55° C. After complete dissolution of the charge, a charge of dibutyl tin dilaurate was added (0.05% by weight based on the total weight of the reactants). The reactants were then slowly heated over a one-half hour period to about 90° C. The reactants were cooled as necessary to 85-90° C. The reaction was monitored by infrared spectroscopy for disappearance of the isocyanate peak. Deionized water was then added to the reactor over a 20 minute period to give a dispersion solids of about 64.5%. The dispersions were held for one hour at about 70-75° C. under agitation. The product was then distilled to remove methyl isobutyl ketone and provide a final dispersion solid of about 40-45%.

Example D

Water Dilutable Additive D

A reactive functional group-containing polysiloxane was prepared from a polysiloxane polyol that was prepared as described below from the mixture of ingredients of Table 4.

TABLE 4

| Ingredients | Equivalent Weight[2] | Equivalents | Parts By Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[24] | 156.7[25] | 594.8 | 93.21 |
| Charge III: | | | |
| Chloroplatinic acid | | 10 ppm | |
| Toluene | | | 0.23 |
| Isopropanol | | | 0.07 |

[24]Polysiloxane-containing silicon hydride, commercially available from Lubrizol Corporation.
[25]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids were added at ambient conditions, and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

To produce the reactive functional group-containing polysiloxane, 360.3 grams of the polysiloxane polyol described above was added to a reaction flask. The polyol was then heated to 60° C. and 84.4 g of m-hexahydrophthalic anhydride was added over 30 minutes. The reaction was held for 3 hours and checked for complete reaction by IR (disappearance of peak at 1790). The reaction was then cooled to ambient temperature and 44.7 g of dimethyl ethanolamine was added over 30 minutes. The reaction was held at ambient temperature for 15 minutes and 383.6 g of deionized water added over 3 hours.

Example E

Additive E

Aqueous Dispersions of Polymeric Microparticles

The aqueous dispersions of polymeric microparticles of Examples E1 to E9 prepared by emulsion polymerization were prepared as described below from a mixture of the following ingredients in a glass reactor equipped with an agitator, a nitrogen blanket, a monomer feed zone, and a thermocouple.

| CHARGE 1 | |
|---|---|
| Deionized Water | |
| AEROSOL OT75[26] | 0.15% active weight percent based on monomer charge |
| Sodium Bicarbonate | 0.125% by weight based on monomer charge |
| CHARGE 2 | |
| Ammonium Persulfate | 0.4% by weight based on monomer charge |
| Water | |

[26] A 75% solution of dioctylsodium sulfosuccinate in isoproponal available from CYTEC Industries, Inc.

Charge 3

Pre-emulsions (weight ratio of monomer to water of 55:45) were prepared from the monomers listed in Table 5 (weight percent based on 100 parts monomer) using 0.5% Aerosol OT75 by active weight based on the monomer charge. The pre-emulsions were prepared by mixing the monomers with the water and surfactant for 30 minutes.

TABLE 5

| Example No. | Styrene | MMA[27] | BA[28] | AA[29] | NMA[30] | HEMA[31] | PS[32] | pH | % Gel[33] |
|---|---|---|---|---|---|---|---|---|---|
| E1 | 44.75 | 44 | 0 | 8.5 | 2 | 2.5 | 1480 | 8.8 | 88 |
| E2 | 89.5 | 0 | 0 | 8.5 | 2 | 0 | 1500 | 7.83 | 98 |
| E3 | 45 | 44.5 | 0 | 8.5 | 2 | 0 | 1500 | 8.85 | 88 |
| E4 | 22.38 | 67.12 | 0 | 8.5 | 2 | 0 | 1350 | 8.62 | 71 |
| E5 | 53.25 | 44.75 | 0 | 2 | 0 | 0 | 1300 | 9.03 | 2 |
| E6 | 44.75 | 42.25 | 0 | 8.5 | 2 | 2.5 | 940[8] | 8.7 | — |
| E7 | 44.75 | 0 | 42.25 | 8.5 | 2 | 0 | 1800 | 7.15 | 98 |
| E8 | 53.25 | 0 | 44.75 | 2 | 2 | 0 | 1800 | 9.75 | — |
| E9 | 90.75 | 0 | 0 | 8.5 | 1.25 | 0 | 1600 | 8.6 | 96 |
| E10 | 44.45 | 42.25 | 0 | 8.5 | 2.0 | 2.8 | 1455 | 9.43 | 98.3 |

[27] Methyl Methacrylate.
[28] Butyl Methacrylate.
[29] Acrylic Acid.
[30] A 50% solution of N-Methylolacrylamide in water available from Cytec Industries, Inc.
[31] Hydroxy Ethyl Methacrylate.
[32] Average particle size measured by photon correlation spectroscopy using a Malvern Zetasizer 3000Hsa.
[33] As measured by digestion of dry particles in acetone.
[34] The amount of surfactant was tripled to reduce particle size.

Charge 1 was heated to about 80° C. under a blanket of nitrogen. Charge 2 then was added at this temperature and held for five minutes. Charge 3 was added over a three-hour period followed by a one-hour hold. The reaction was allowed to cool to less than 50° C. and a portion of dimethyl amino ethanol in water (50:50 ratio) was added to increase the pH to about 7.0. The respective polymers each had a solid content of about 32%.

Example F1

Film-Forming Compositions Containing Materials from Examples A, C and D

Film-forming compositions were prepared as described below from the components listed in Table 6. Seven film-forming compositions were prepared for Example F1 by varying the Example C additive as reflected in Table 7.

TABLE 6

| Component No. | Description | Amount (grams) |
|---|---|---|
| 1 | Resinous Binder of Example A | 183.5 |
| 2 | Polysiloxane of Example D | 2.13 |
| 3 | TEXANOL[35] | 9.0 |
| 4 | Butyl Acetate[36] | 3.0 |
| 5 | Deionized water | 29.00 |
| 6 | Additives of Example C | 12.5 |
| 7 | CYMEL 327[37] | 12.8 |
| 8 | CYMEL 303[38] | 3.0 |
| 9 | Premix 1 | |
|   | CYMEL 327 | 5.3 |
|   | AEROSIL 200[39] | 0.2 |
| 10 | Premix 2 | |
|   | Dodecylbenzylsulfonic Acid | 0.2 |
|   | Dimethylethanolamine (50% in deionized water)[40] | 0.182 |
|   | Deionized water | 0.160 |
| 11 | Premix 3 | |
|   | BORCHI Gel LW44[41] | 0.24 |
|   | Deionized Water | 0.96 |

[35] 2,2,4 Trimmethyl-1,3 Pentanediol Monoisobuterate available from Dow Chemical Company.
[36] N-Butyl Acetate available from Dow Chemical Company.
[37] High Imino Melamine-Formaldehyde Crosslinking Agent available from Cytec Industries, Inc.
[38] Hexamethoxymethyl melamine resin available from Cytec Industries, Inc.
[39] Silica commercially available from Degussa Corporation.
[40] Available from PPG Industries, Inc.
[41] Non-ionic, polyurethane based thickener available from Borchers GmbH.

Premix 1 was prepared by adding the Areosil 200 to the Cymel 327 and stirring. The mixture was added to an EIGER mill to achieve a grind fineness of 7+Hegman. Premix 2 was prepared slowly agitating dodecylbenzylsulfonic acid and adding demethylehtanolamine (50% in deionized water) and deionized water. Premix 3 was prepared by stirring the Borchi Gel LW44 and adding deionized water until a uniform consistency was achieved.

The film-forming composition was prepared by charging component 1 and then adding component 2 under agitation until fully incorporated. Then, under moderate agitation, components 3 to 11 were added. The final compositions had a solids content of 45% and a viscosity of 30 seconds using a #4 Din cup.

Test Substrates

The test substrates were ACT cold roll steel panels (4"× 12") supplied by ACT Laboratories, Inc. and were electrocoated with a cationic electrodepositable primer commercially available from PPG Industries, Inc. as ED-6060. The panels were then spray coated in two coats with EWB Reflex Silver Basecoat commercially available from PPG Industries, Inc. to film thicknesses ranging from 0.4 to 0.6 mils. The basecoat was flashed for 5 minutes at ambient temperature and then baked for 5 minutes at 176° F. (80° C.). The substrate was then cooled to ambient temperature. After cooling, film-forming compositions of Example F1 were spray applied, with a target film thickness of 1.3 to 1.7 mils, in two coats without flash time between coats. The substrates coated with the Example F1 compositions were flashed for 2 minutes at ambient temperature and then the coated substrates were placed in an oven at 150° C., prior to increasing the oven temperature to 311° C. The coated substrates were cured for 23 minutes in an oven set at 311° C. Appearance and properties for the coatings are reported below in Table 7.

TABLE 7

| Coating Example No. | Water Dilutable Additive C Example No. | Gloss[42] | Haze[42] | DOI[43] | LW[44] | SW[44] | % 20° Gloss Retained after scratch testing[45] |
|---|---|---|---|---|---|---|---|
| F1a | C1 | 100 | 345 | 76 | 4 | 14 | 56 |
| F1b | C4 | 99 | 331 | 78 | 4 | 15 | 40 |
| F1c | C10 | 99 | 322 | 81 | 3 | 15 | 41 |
| F1d | C12 | 99 | 350 | 75 | 8 | 14 | 46 |
| F1e | C3 | 99 | 339 | 81 | 4 | 17 | 44 |
| F1f | C11 | 100 | 350 | 77 | 4 | 13 | 46 |
| F1g | C2 | 99 | 330 | 83 | 3 | 15 | 43 |

[42] Gloss and haze of test panels coated as described above was determined at a 20° angle using a Micro-TriGloss Reflectometer available from BYK Gardner, Inc.
[43] Distinctness of image ("DOI") of sample panels was determined using a Dorigon II DOI Meter, which is commercially available from Hunter Lab, where a higher value indicates better coating appearance on the test panel.
[44] Smoothness of the coated test panels was measured using a Byk Wavescan in which results are reported as long wave and short wave numbers where lower values mean smoother films.
[45] Coated panels were subjected to scratch testing by linearly scratching the coated surface with a weighted abrasive paper for ten double rubs using an Atlas AATCC Scratch Tester, Model CM-5, available from Atlas Electrical Devices Company of Chicago, Illinois. The abrasive paper used was 3M 281Q WETORDRY ™ PRODUCTION ™ 9 micron polishing paper sheets, which are commercially available from 3M Company of St. Paul, Minnesota. Panels were then rinsed with tap water and carefully patted dry with a paper towel. The 20° gloss was measured (using the same gloss meter as that used for the initial 20° gloss) on the scratched area of each test panel. Using the lowest 20° gloss reading from the scratched area, the scratch results are reported as the percent of the initial gloss retained after scratch testing using the following calculation: 100% * (scratched)/(initial gloss). Higher values for percent of gloss retained are desirable.

Example F2

Film-Forming Compositions Containing Materials from Examples A, C and D

Film-forming compositions were prepared as described below from the components listed in Table 8. The compositions were prepared in the same manner as the compositions of Example F1 described above. Seven film-forming compositions were prepared for Example F2 by varying the Example C additive as reflected in Table 9.

TABLE 8

| Component No. | Description | Amount (grams) |
|---|---|---|
| 1 | Resinous Binder of Example A | 183.5 |
| 2 | Polysiloxane of Example D | 2.13 |
| 3 | TEXANOL | 9.0 |
| 4 | Butyl Acetate | 3.0 |
| 5 | Deionized water | 29.00 |
| 6 | Additives of Example C | 7.7 |
| 7 | CYMEL 327 | 12.8 |
| 8 | CYMEL 303 | 3.0 |
| 9 | Premix 1 | |
|  | CYMEL 327 | 5.3 |
|  | AEROSIL 200 | 0.2 |
| 10 | Premix 2 | |
|  | Dodecylbenzylsulfonic Acid | 0.2 |
|  | Dimethylethanolamine (50% in deionized water) | 0.182 |
|  | Deionized water | 0.160 |
| 11 | Premix 3 | |
|  | BORCHI Gel LW44 | 0.24 |
|  | Deionized Water | 0.96 |

Test Substrates

The test substrates were prepared in the same manner as is described in Example F1 above. Appearance and properties for the coatings of Example F2 are reported below in Table 9. These properties were measured by the same methods as described above for the coatings of Example F1.

TABLE 9

| Coating Example No. | Water Dilutable Additive C Example No. | Gloss | Haze | DOI | LW | SW | % 20° Gloss Retained after scratch testing |
|---|---|---|---|---|---|---|---|
| F2a | C1 | 100 | 337 | 80 | 3 | 17 | 56 |
| F2b | C4 | 96 | 335 | 71 | 6 | 16 | 48 |
| F2c | C10 | 99 | 347 | 74 | 5 | 15 | 50 |
| F2d | C12 | 99 | 343 | 72 | 5 | 15 | 49 |
| F2e | C3 | 99 | 340 | 78 | 4 | 15 | 39 |
| F2f | C11 | 99 | 341 | 75 | 4 | 15 | 54 |
| F2g | C2 | 99 | 344 | 73 | 5 | 15 | 43 |

Example G

Compositions Containing Materials from Examples A, C1 and D

Film-forming compositions were prepared as described below from the components listed in the following Table 10.

TABLE 10

| Component No. | Description | Amount (grams) Example G1 | Example G2 | Example G3 | Example G4 |
|---|---|---|---|---|---|
| 1 | Resinous Binder of Example A | 174.6 | 174.6 | 174.6 | 174.6 |
| 2 | Byk 345[46] | 0.48 | 0.48 | 0.48 | 0.48 |
| 3 | Byk 325[47] | 0.24 | 0.24 | 0.24 | 0.24 |
| 4 | Polysiloxane of Example D | 4.25 | 4.25 | 4.25 | 4.25 |
| 5 | TEXANOL | 10.0 | 10.0 | 10.0 | 10.0 |
| 6 | Isobutanol | 6.0 | 6.0 | 6.0 | 6.0 |
| 7 | Isosteryl Alcohol | 4.0 | 4.0 | 4.0 | 4.0 |
| 8 | Deionized water | 15.0 | 15.0 | 15.0 | 15.0 |
| 9a | Additive of Example C1 | 0 | 2.5 | 6.3 | 10.5 |
| 9b | CYMEL 303 | 3.1 | 0 | 0 | 0 |
| 10 | Premix 1 | | | | |
|  | CYMEL 327 | 19.88 | 23.5 | 23.5 | 23.5 |
|  | AEROSIL 200 | 0.4 | 0.4 | 0.4 | 0.4 |
| 11 | Premix 2 | | | | |
|  | Dodecylbenzylsulfonic Acid | 0.196 | 0.196 | 0.196 | 0.196 |

TABLE 10-continued

| Component No. | Description | Amount (grams) | | | |
|---|---|---|---|---|---|
| | | Example G1 | Example G2 | Example G3 | Example G4 |
| | Dimethylethanolamine (50% in deionized water) | 0.167 | 0.167 | 0.167 | 0.167 |
| | Deionized water | 0.167 | 0.167 | 0.167 | 0.167 |
| 12 | Premix 3 | | | | |
| | BORCHI Gel LW44 | 0.214 | 0.4 | 0.4 | 0.374 |
| | Deionized Water | 0.856 | 1.6 | 1.6 | 1.496 |

[46]Available from Byk-Chemie, Wallingford, CT.
[47]Available from Byk-Chemie, Wallingford, CT.

Premix 1 was prepared by adding the Areosil 200 to the Cymel 327 and stirring. The mixture was added to an EIGER mill to achieve a grind fineness of 7+Hegman. Premix 2 was prepared slowly agitating dodecylbenzylsulfonic acid and adding demethylehtanolamine (50% in deionized water) and deionized water. Premix 3 was prepared by stirring the Borchi Gel LW44 and adding deionized water until a uniform consistency was achieved.

The film-forming composition was prepared by charging components 1 through 3 and then adding component 4 under agitation until fully incorporated. Then, under moderate agitation, components 5 to 12 were added. The final compositions had a solids content of 45% and a viscosity of about 30 seconds using a #4 Din cup.

Test Substrates

The test substrates were ACT cold roll steel panels (4"× 12") supplied by ACT Laboratories, Inc. and were electrocoated with a cationic electrodepositable primer commercially available from PPG Industries, Inc. as ED-6060. The panels were then spray coated in two coats with EWB Obsidian Schwartz Basecoat commercially available from PPG Industries, Inc. to film thicknesses ranging from 0.4 to 0.6 mils. The basecoat was flashed for 5 minutes at ambient temperature and then baked for 5 minutes at 176° F. (80° C.). The substrate was then cooled to ambient temperature. After cooling, film-forming compositions of Example G1-G4 were spray applied, with a target film thickness of 1.3 to 1.7 mils, in two coats without flash time between coats. The substrates coated with the Example G compositions were flashed for 2 minutes at ambient temperature and then the substrates were placed in an oven at 150° C., prior to increasing the oven temperature to 311° C. The coated substrates were cured for 23 minutes in an oven set at 311° C. Appearance and properties for the coatings of Example G are reported below in Table 11.

TABLE 11

| Coating Example No. | Gloss | Haze | DOI | LW | SW | % 20° Gloss Retained after scratch testing | Pop Resistance microns pop[48] |
|---|---|---|---|---|---|---|---|
| G1 | 93 | 17 | 87 | 7.4 | 15.8 | 24 | 35 |
| G2 | 93 | 21 | 92 | 9.7 | 18.5 | 24 | 40 |
| G3 | 93 | 90 | 20 | 9.1 | 16.7 | 31 | 42 |
| G4 | 92 | 24 | 92 | 7.2 | 17.2 | 24 | 45 |

[48]Pop resistance (measures the ability of the coating to resist the release of air from the coating composition as it is cured) was evaluated visually by examining the panels for pops and noting the film thickness at which the popping begins. This is done by visually viewing the panel and determining the lowest film build without significant popping for panels coated with increasing film thickness along the distance from the top of the panel which had the lowest film build. A higher value indicates better resistance to popping.

Example H

Compositions Containing Materials from Examples B, C, D and E

Film-forming compositions were prepared as described below from the components listed in the following Table 12.

TABLE 12

| Component No. | Description | Amount (grams) |
|---|---|---|
| 1 | Resinous Binder of Example B | 142.25 |
| 2 | Microparticles of Example E | 4.75 |
| 3 | Polysiloxane from Example D | 2.13 |
| 4 | TEXANOL | 10.0 |
| 5 | Isostearyl Alcohol[46] | 4.0 |
| 6 | Deionized water | 29.00 |
| 7 | Additive from Example C1 | 12.5 |
| 8 | CYMEL 303 | 3.0 |
| 9 | Premix 1 | |
| | RESIMENE 741[47] | 12.0 |
| | AEROSIL 200 | 0.24 |
| 10 | Premix 2 | |
| | Dodecylbenzylsulfonic Acid | 0.2 |
| | Dimethylethanolamine (50% in deionized water) | 0.182 |
| | Deionized water | 0.160 |
| 11 | Premix 3 | |
| | BORCHI Gel LW44 | 0.24 |
| | Deionized Water | 0.96 |

[46]Available from Goldschmidt Chemical Corp., Hopewell, Virginia.
[47]Methoxymethyl melamine resin available from Cytec Industries, Inc.

Premix 1 was prepared by adding the AEROSIL 200 to the RESIMENE 741 and stirring. The mixture was added to an EIGER mill to achieve a grind fineness of 7+Hegman. Premix 2 was prepared slowly agitating dodecylbenzylsulfonic acid and adding demethylehtanolamine (50% in deionized water) and deionized water. Premix 3 was prepared by stirring the Borchi Gel LW44 and adding deionized water until a uniform consistency is achieved.

The film-forming composition was prepared by blending components 1 and 2 and then adding component 3 under agitation until fully incorporated. Then, under moderate agitation, components 3 to 11 are added. The final compositions had a solids content of 45% and a viscosity of 30 seconds using a #4 Din cup.

Test Substrates

The test substrates were prepared in the same manner as is described in Example F1. Appearance and properties for the coatings of Example G are reported below in Table 13. The gloss, haze, DOI, and LW/SW smoothness were measured by the same methods as described for the coatings of Example F1.

TABLE 13

| Coating Example No. | Additive E Example No. | Gloss | Haze | DOI | LW | SW | Pop resistance microns pop[48] | Pop for control each set |
|---|---|---|---|---|---|---|---|---|
| Control | None | 95 | 17 | 96 | 4.8 | 19.2 | 40 | |
| G1 | E1 | 94 | 14 | 97 | 1.6 | 7.0 | 50 | 45 |
| G2 | E2 | 94 | 17 | 94 | 6.3 | 12.2 | 100 | 40 |
| G3 | E3 | 96 | 16 | 90 | 19.3 | 17.9 | 45 | 40 |
| G4 | E4 | 96 | 17 | 89 | 17.7 | 20.3 | 48 | 40 |
| G5 | E5 | 94 | 14 | 97 | 1.6 | 8 | 45 | 45 |
| G6 | E6 | 95 | 15 | 95 | 6.2 | 17.5 | 38 | 41 (with control MG 45) |
| G7 | E9 | 95 | 15 | 96 | 4 | 22.8 | 47 | 45 |

Example I

This example describes the preparation of three water-based pigmented primer coating compositions. The primer coating compositions of Examples I-2 and I-3 contain the aqueous dispersion of polymeric microparticles of Example E10 in accordance with the present invention, while the composition of Comparative Example I-1 contains none. The respective primer coating compositions were prepared as described below from a mixture of the following ingredients.

| Ingredients | Example I-1 (Comparative) | Example I-2 | Example I-3 |
|---|---|---|---|
| RESYDROL AX906W[1] | 32.1 | 32.1 | 32.1 |
| Dimethyl ethanolamine | 0.09 | 0.09 | 0.09 |
| Deionized water | 2.7 | 2.7 | 2.7 |
| SURFYNOL 104E[2] | 0.17 | 0.17 | 0.17 |
| Titanium dioxide | 34.77 | 34.77 | 34.77 |
| Polyurethane aqueous dispersion[3] | 10.6 | 10.6 | 10.6 |
| DAOTAN VTW-1225[4] | 10.3 | 10.3 | 10.3 |
| RESIMENE 745[5] | 8.3 | 8.3 | 8.3 |
| Mineral spirits | 0.6 | 0.6 | 0.6 |
| Dimethyl ethanolamine | 0.37 | 0.37 | 0.37 |
| Dispersion of polymeric microparticles of Example E10 | 0 | 1.7 | 3.4 |

[1] Resinous binder available from UCB-Surface Specialties.
[2] Wetting agent available from Air Products and Chemicals, Inc.
[3] High molecular weight polyurethane-polyester prepared as follows:.
(i) an isocyanate prepolymer was first prepared as follows: a reaction vessel equipped with stirrer, thermocouple, condenser and nitrogen inlet was charged with 1362.0 g TERATHANE ® 2000, 280.4 g of the product of Example 2, 91.2 g dimethylolpropionic acid, 605.6 g isophorone diisocyanate, 580.0 g methyl ethyl ketone and heated to 60° C.; then 2.72 g dibutyltin dilaurate was added and the reaction exothermed to 78° C.; the reaction temperature was raised to 80° C. and the contents were stirred until the isocyanate equivalent weight was 1286; hen 71.5 g dimethylolpropionic acid was added to the reaction flask and the contents were stirred until the isocyanate equivalent weight was 1882.6.
(ii) the prepolymer was dispersed then excess organic solvent was removed via vacuum distillation as follows: 1392.0 g of the above prepolymer was added over 19 minutes to a solution of 2028.1 g deionized water, 61.8 g adipic acid dihydrazide and 50.4 g dimethyl ethanol amine stirring at 25° C. and at 510 rpm in a cylindrical gallon reaction flask equipped with baffles, double pitched bladed stirrer, thermocouple and condenser, the dispersion temperature after this addition was 41° C.; the reaction contents were stirred until no evidence of isocyanate was observed by FTIR; the dispersion was transferred to a flask equipped with a stirrer, thermocouple, condenser and a receiver, and heated to 60° C. during which time methyl ethyl ketone and water were removed by vacuum distillation. The final dispersion had a solids content of 39.81 weight percent (measured for one hour at 110° C.), a Brookfield viscosity of 240 centipoise using a #3 spindle at 60 rpm, an acid content of 0.203 meq acid/g, a case content of 0.200 meq base/g, a pH of 7.64 and a weight average molecular weight of 49148 in DMF.
[4] Polyurethane dispersion available from UCT-Surface Specialties
[5] Melamine curing agent available from Solutia.

Each of the primer coating compositions of Examples I-1 through I-3 above were prepared by mixing sequentially under mild agitation the ingredients listed above. The viscosity of each of the primer compositions was adjusted using deionized water to 45 seconds using a #4 Ford Cup at ambient temperature.

Sag Resistance Testing Procedure:

4"×12" steel panels coated with ED 6060 cationic electrocoat (available from PPG Industries, Inc.) (prepared test panels available from ACT Laboratories, Inc.) were used for sag resistance testing. Five holes (10 millimeter diameter each) were punched equidistance apart down the length of each test panel. For application of each composition, a test panel was positioned vertically with the holes running from left to right. Each of the respective primer compositions of Examples I-1 through I-3 were spray applied in two coats to the test panel using automated spray equipment at 75% relative humidity at 75° F. (23.9° C.) using 230 cc of the composition in each pass to create a film thickness wedge (i.e., film thickness increasing from left to right of the test panel). Each of the coated test panels was then allowed to "flash" at 75% relative humidity/ 75° F. (23.9° C.), then heated for 25 minutes at a temperature of 285° F. (140.6° C.). Sag resistance was measured by recording the length (millimeters) of the "sag", i.e., the coating that ran from the bottom of the hole at a given dry film thickness. For purposes of the present invention, the sag was measured at a dry film thickness of 45 microns. The sag resistance test results are set forth in Table 14 below:

TABLE 14

| | Sag Resistance Test | | |
|---|---|---|---|
| | Comparative Example I-1 | Example I-2 | Example I-3 |
| Mm of sag | 20 mm/45μ | 2 mm/45μ | 0 mm/45μ |

The data presented in Table 14 above illustrate that the primer coating compositions containing the aqueous dispersion of polymeric microparticles of Example E10 in accordance with the present invention show a significant improvement in sag resistance over an analogous composition which does not contain the aqueous dispersion of polymeric microparticles.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the embodiments described in detail herein are illustrative only and are not limiting to the scope of the invention which is to be given the full breadth of the appended claims and any and all equivalents thereof.

Therefore, we claim:

1. A multi-layer composite coating comprising a basecoat deposited from at least one basecoat film-forming composition and a topcoat composition applied over at least a portion of the base coat in which the topcoat is deposited from at least one topcoat film forming composition that is substantially free of organic solvent, the topcoat film-forming composition comprising:
an aqueous dispersion of polymeric microparticles prepared by emulsion polymerization of a monomeric composition comprising:
(1) at least 10 percent by weight of one or more vinyl aromatic compounds;
(2) 0.1 to 10 percent by weight of one or more carboxylic acid functional polymerizable, ethylenically unsaturated monomers;
(3) 0 to 10 percent by weight of one or more polymerizable monomers having one or more functional groups which are capable of reacting to form crosslinks; and
(4) one or more polymerizable, ethylenically unsaturated monomers,
where the weight percentages are based on total weight of monomers present in the monomeric composition;
wherein each of (1), (2), (3) and (4) are different one from the other and wherein at least one of (3) and (4) is present in the monomeric composition; and
wherein the topcoat film-forming composition comprises a material comprising a reactive-functional group-containing polysiloxane; and wherein the material comprising the reactive-functional group-containing polysiloxane is different from the microparticles of the aqueous dispersion.

2. The multi-layer composite coating of claim 1, wherein the base coat film-forming composition comprises one or more pigments.

3. The multi-layer composite coating of claim 1, wherein the topcoat film-forming composition is substantially free of pigments.

4. The multi-layer composite coating of claim 1, wherein the topcoat film-forming composition further comprises inorganic particles selected from fumed silica, amorphous silica, alumina, colloidal alumina, titanium dioxide, zirconia, colloidal zirconia, and mixtures thereof.

5. The multi-layer composite coating of claim 4, wherein the inorganic particles have an average particle size ranging from 1 to 1000 nanometers prior to incorporation into the topcoat film-forming composition.

6. The multi-layer composite coating of claim 4, wherein the inorganic particles have an average particle size ranging from 1 to 10 microns prior to incorporation into the topcoat film-forming composition.

7. The multi-layer composite coating of claim 1, wherein the one or more vinyl aromatic compounds (1) comprises a compound selected from the group consisting of styrene, alpha-methyl styrene, vinyl toluene, para-hydroxy styrene and mixtures thereof.

8. The multi-layer composite coating of claim 1, wherein the one or more vinyl aromatic compounds is present in the monomeric composition in an amount ranging from 10 to 98 percent by weight based on total weight of monomers present in the monomeric composition.

9. The multi-layer composite coating of claim 8, wherein the one or more vinyl aromatic compounds is present in the monomeric composition in an amount ranging from 20 to 80 percent by weight based on total weight of monomers present in the monomeric composition.

10. The multi-layer composite coating of claim 1, wherein the one or more carboxylic acid functional polymerizable, ethylenically unsaturated monomers (2) comprises a monomer selected from the group consisting of acrylic acid, methacrylic acid, itaconic acid, fumaric acid, maleic acid, anhydrides thereof, and mixtures thereof.

11. The multi-layer composite coating of claim 1, wherein the one or more carboxylic acid functional polymerizable, ethylenically unsaturated monomers (2) is present in the monomeric composition in an amount ranging from 0.5 to 8 percent by weight based on total weight of monomers present in the monomeric composition.

12. The multi-layer composite coating of claim 11, wherein the one or more carboxylic acid functional polymerizable, ethylenically unsaturated monomers (2) is present in the monomeric composition in an amount ranging from 1 to 5 percent by weight based on total weight of monomers present in the monomeric composition.

13. The multi-layer composite coating of claim 1, wherein the one or more polymerizable monomers having functional groups which are capable of reacting to form crosslinks after polymerization (3) comprise functional groups selected from amide groups, hydroxyl groups, amino groups, epoxy groups, thiol groups, isocyanate groups, carbamate groups, and mixtures thereof.

14. The multi-layer composite coating of claim 1, wherein the one or more polymerizable monomers having functional groups which are capable of reacting to form crosslinking (3) comprise a compound selected from γ-(meth)acryloxytrialkoxysilane, N-methylol(meth)acrylamide, N-butoxymethyl(meth)acrylamide, (meth)acryliclactones, N-substituted (meth)acrylamide lactones, (meth)acryliclactams, N-substituted (meth)acrylamide lactams, and glycidyl (meth)acrylate, and mixtures thereof.

15. The multi-layer composite coating of claim 1, wherein the one or more polymerizable monomers having functional groups which are capable of reacting to form crosslinks (3) are present in the monomeric composition in an amount ranging from 0.5 to 8 percent by weight based on total weight of monomers present in the monomeric composition.

16. The multi-layer composite coating of claim 15, wherein the one or more polymerizable monomers having functional groups which are capable of reacting to form crosslinks (3) is present in the monomeric composition in an amount ranging from 1 to 5 percent by weight based on total weight of monomers present in the monomeric composition.

17. The multi-layer composite coating of claim 1, wherein the one or more polymerizable, ethylenically unsaturated monomers (4) are present in the monomeric composition in an amount ranging from 0.5 to 50 percent by weight based on total weight of monomers present in the monomeric composition.

18. The multi-layer composite coating of claim 17, wherein the one or more polymerizable, ethylenically unsaturated monomers (4) are present in the monomeric composition in an amount ranging from 20 to 40 percent by weight based on total weight of monomers present in the monomeric composition.

19. The multi-layer composite coating of claim 1, wherein the polymeric microparticles have an average particle size ranging from 800 to 10,000 Angstroms.

20. The multi-layer composite coating of claim 1, wherein the aqueous dispersion of polymeric microparticles is present in the topcoat film-forming composition an amount ranging from 1.0 to 20 percent by weight based on total weight of resin solids present in the topcoat film-forming composition.

21. The multi-layer composite coating of claim 20, wherein the aqueous dispersion of polymeric microparticles is present in the topcoat film-forming composition an amount ranging from 1.0 to 15 percent by weight based on total weight of resin solids present in the topcoat film-forming composition.

22. The multi-layer composite coating of claim 1, wherein the topcoat film-forming composition comprises a thermosetting composition.

23. The multi-layer composite coating of claim 1, wherein the topcoat film-forming composition comprises a thermoplastic composition.

24. The multi-layer composite coating of claim 22, wherein the topcoat film-forming composition further comprises (a) a resinous binder system comprising a reactive functional group-containing polymer, and (b) a crosslinking agent having functional groups reactive with the functional groups of the polymer.

25. The multi-layer composite coating of claim 24, wherein the resinous binder (a) comprises a second aqueous dispersion of polymeric microparticles.

26. The multi-layer composite coating of claim 25, wherein the second aqueous dispersion of polymeric microparticles comprises: (i) at least one substantially hydrophobic polymer having reactive functional groups; and (ii) at least one substantially hydrophobic crosslinking agents having functional groups reactive with the functional groups of the polymer (i).

27. A substrate comprising
a substrate, and
the multi-layer composite coating of claim 1 over at least a portion of the substrate.

28. A multi-layer composite coating comprising a basecoat deposited from at least one basecoat film-forming composition and a topcoat composition applied over at least a portion of the base coat in which the topcoat is deposited from at least one topcoat film forming composition that is substantially free of organic solvent, the topcoat film-forming composition comprising:
an aqueous dispersion of polymeric microparticles prepared by emulsion polymerization of a monomeric composition consisting of:
(1) at least 10 percent by weight of one or more vinyl aromatic compounds;
(2) 0.1 to 10 percent by weight of one or more carboxylic acid functional polymerizable, ethylenically unsaturated monomers;
(3) 0 to 10 percent by weight of one or more polymerizable monomers having one or more functional groups which are capable of reacting to form crosslinks; and
(4) one or more polymerizable, ethylenically unsaturated monomers,
where the weight percentages are based on total weight of monomers present in the monomeric composition;
wherein each of (1), (2), (3) and (4) are different one from the other and wherein at least one of (3) and (4) is present in the monomeric composition; and
wherein the topcoat film-forming composition comprises a material comprising a reactive-functional group-containing polysiloxane; and wherein the material comprising the reactive-functional group-containing polysiloxane is a second water dilutable additive that is different from the polymeric microparticles of the aqueous dispersion.

\* \* \* \* \*